United States Patent [19]
Johnson

[11] 3,911,954
[45] Oct. 14, 1975

[54] HINGED EXTENSION FOR RAINPIPE DOWNSPOUTS

[76] Inventor: Paul J. Johnson, 8317 Chestnut St., Wauwatosa, Wis. 53213

[22] Filed: Jan. 17, 1975

[21] Appl. No.: 541,711

Related U.S. Application Data

[63] Continuation-in-part of Ser. No. 466,017, May 1, 1974, Pat. No. 3,861,419.

[52] U.S. Cl. ................ 137/615; 61/14; 285/184; 285/283
[51] Int. Cl.² .......................................... F16L 27/00
[58] Field of Search ............ 285/184, 283, 109, 9 R, 285/179; 137/615; 61/14, 15

[56] References Cited
UNITED STATES PATENTS
| | | | |
|---|---|---|---|
| 763,652 | 6/1904 | Allen | 285/283 |
| 943,900 | 12/1909 | Smith | 285/109 X |
| 2,125,762 | 8/1938 | Wheeler | 285/283 X |
| 2,898,939 | 8/1959 | Fox | 61/15 |
| 2,975,805 | 3/1961 | Horn | 285/184 X |
| 3,352,573 | 11/1967 | Canning | 285/283 X |

*Primary Examiner*—Thomas F. Callaghan

[57] ABSTRACT

A hinge device is provided for connecting a downspout and an extension therefor to enable directing rainwater away from the foundation of a structure. The hinged connection enables the extension to be selectively pivoted to provide clearance for routine yard work, such as mowing the lawn. A resilient means is provided as part of the hinged device for preventing accidental injuries during use.

6 Claims, 3 Drawing Figures

HINGED EXTENSION FOR RAINPIPE DOWNSPOUTS

BACKGROUND OF THE INVENTION

This application is a continuation-in-part of U.S. application Ser. No. 466,017, filed by the present inventor on May 1, 1974 and now U.S. Pat. No. 3,861,419.

Conventional downspouts for rain gutters on houses and other building structures are often provided with an extension pipe for directing rainwater away from the building's foundation. Such extensions are generally affixed to an elbow attached to the lower end of the downspout. The extensions generally comprise a sheet metal pipe having a cross-section similar to the elbow and for slidably engaging the free end of the elbow. The disadvantage of such pipe extensions is that they often obstruct the yard area surrounding the building. Thus, they may interfere with such routine tasks as mowing the surrounding lawn area.

In the aforementioned co-pending application a novel hinge for such downspouts and extensions is disclosed which permits the extension to be pivoted to a position generally parallel to the downspout, thereby providing clearance for yard work. While such a hinged connection represents a substantial improvement, it suffers from the drawback that the two adjoining ends of the downspout and extension slidably engage one another, and the possibility exists that the homeowner or his children could be injured by having the hand or a finger pinched between the sharp pipe ends as the extension is lowered into the operative position. It would be desirable to have a hinged connection with the advantages described in said co-pending application which, at the same time, would be free from this possible safety hazard.

SUMMARY OF THE INVENTION

It is an object of the present invention to provide an improved means for connecting rainpipe extensions and downspouts which permits the two members to be selectively disengaged by means of a hinged connection.

Other more specific objects and advantages of the present invention will become apparent from the description of a preferred embodiment which follows.

In general, the invention comprises a hinge for connecting a downspout and an extension therefor to enable the extension to be pivoted away from the downspout elbow. More specifically, the invention comprises a resilient member as part of said hinge for permitting coupling of said downspout elbow and extension in such a manner that the sharp adjoining ends of the two sheet metal pipes are spaced apart from one another, and wherein said resilient member prevents leaks at the connection.

DESCRIPTION OF A PREFERRED EMBODIMENT

Figure 2:
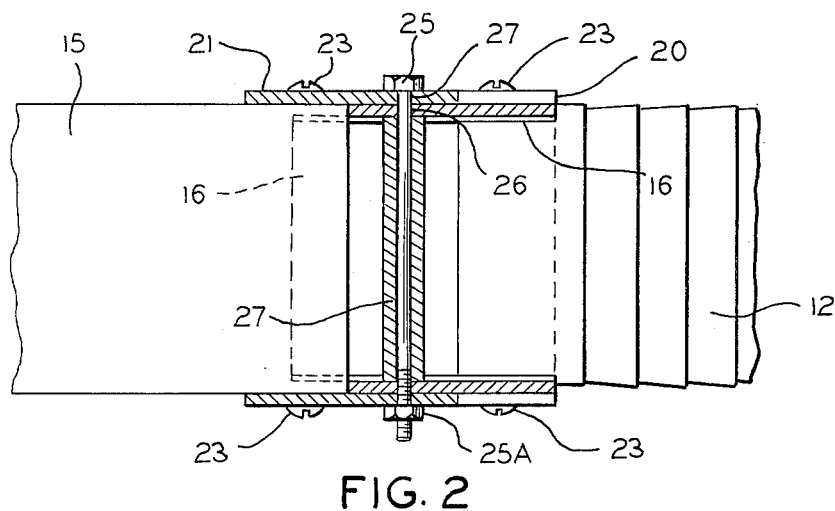
FIG. 2 is a view taken along line 2—2 of FIG. 1.
Figure 1:
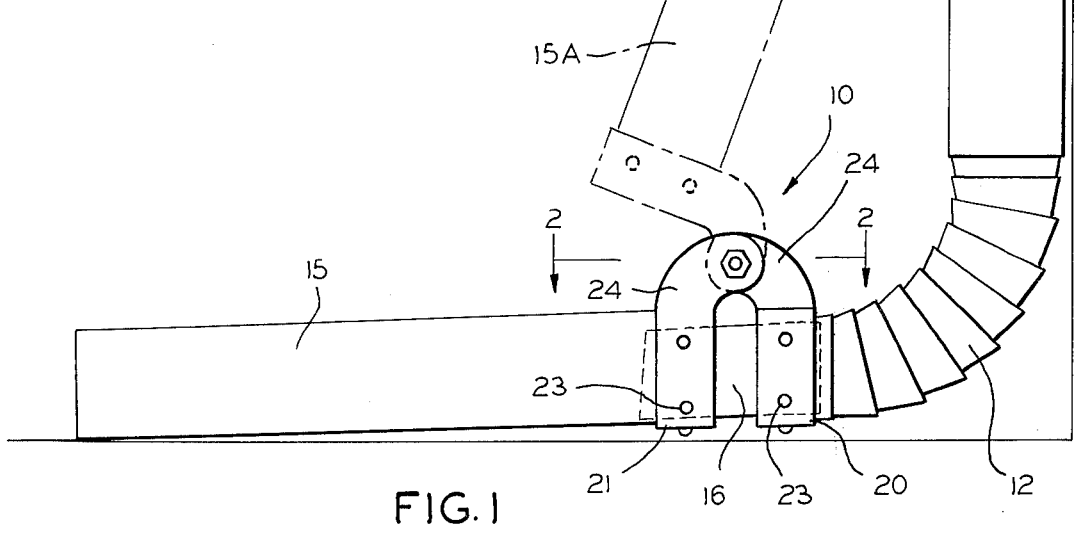
FIG. 1 is a side elevational view of a hinged extension for a downspout according to the present invention.

FIGS. 1 and 2 show a hinged extension pipe constructed according to the invention. A hinge assembly 10 is provided which joins an elbow 12 of a conventional downspout 13 to an extension pipe 15. Downspout 13 may extend downwardly from a rain gutter (not shown) and may be supported in a conventional manner adjacent building 14. Elbow 12 may be slidably mounted on the lower extremity of downspout 13 in a conventional manner. The hinge assembly 10 generally comprises a pair of U-shaped bracket members 20 and 21 which are attached to elbow 12 and extension 15, respectively. The bracket members 20 and 21 may be constructed of any suitable material such as sheet metal, plastic or hard rubber and are formed so that their interior surfaces conform to the peripheral dimensions of the sides and bottoms of the elbow 12 and extension pipe 15. The bracket members 20 and 21 may be attached to elbow 12 and extension 15 in any suitable manner such as by sheet metal screws 23.

Figure 3:
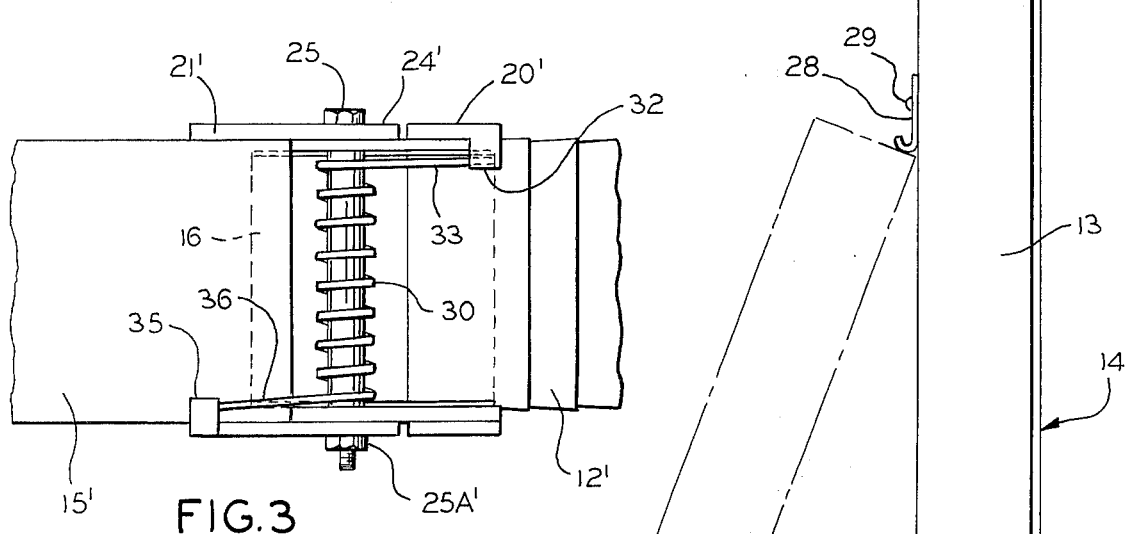
FIG. 3 depicts an alternate embodiment of the invention in a view similar to that of FIG. 2.

As seen in FIGS. 1 and 3, the bracket members 20 and 21 each have a pair of ear portions 24 formed at the upper ends of the legs of each U. The ears 24 extend longitudinally in a direction parallel to the central axis of extension pipe 15 toward the opposite bracket member 20 or 21. The ears 24 of bracket 21 may be formed generally parallel to the sides of bracket 21, while the ears 24 of bracket 20 are deflected inwardly to be received by the ears 24 of bracket 21. A hinge pin 25 is provided which extends through aligned apertures 26 and 27 formed in the ears 24 of brackets 20 and 21, respectively. Pin 25 may comprise a conventional threaded bolt retained by lock nut 25A. A spacer sleeve 27 may be provided on pin 25 between the ears 24 of bracket 20. Other means can be used for connecting the brackets such as individual pins for each pair overlapping ears. As seen in FIG. 1, brackets 20 and 21 are positioned on elbow 12 and extension pipe 15 so that extension pipe 15 is spaced apart slightly from elbow 12, and the space may be approximately ½ inch or more.

Also shown in FIGS. 1–3 is a resilient coupling member 16 which, in the preferred embodiment, comprises a nominally flat piece of rubber or plastic which is formed into a generally U-shape when folded around the end of elbow 12 and held in place by bracket 20. Member 16 protrudes outwardly from elbow 12 and the exposed portion is suitably tapered to permit engagement with extension 15 in a fluid sealing manner. Many modifications of member 16 can be made without departing from the scope of the invention. For example, member 16 could completely surround the end of elbow 12, but covering the top of the space between the elbow and extension is not necessary and such a modification might require different members 16 for different size pipes. Member 16 could also be attached to extension 15 rather than to elbow 12, but in this case it would be necessary to have member 16 slidably engage the exterior of bracket 20 to form a suitable seal therewith. Finally, member 16 can be molded as an integral part either of bracket 20 or bracket 21. Of course, member 16 can be molded, pre-shaped, folded, etc. to facilitate packaging of the combination for sale.

The advantage of using resilient member 16 should be readily apparent from the FIGURES. Since the ends of extension 15 and elbow 12 are spaced apart from one another, the sharp edges thereof do not engage each other during pivotal movement of the extension. Therefore, the possibility of injury resulting from pinching the hand or fingers between the sharp edges is eliminated. If a finger is accidentally inserted between the two pipes during use of the present invention, the resilient member 16 will absorb the forces and prevent injury.

As seen in FIG. 1, hinge assembly 10 enables extension pipe 15 to be pivotally raised to a position indicated by phantom lines 15A whereby the end of extension 15 may be placed in contact with the upper portion of downspout 13. A spring catch 28 may be affixed to downspout 13 by a conventional sheet metal screw 29 or other suitable means. In its raised position, extension 15 will engage spring 28 which frictionally engages the end of extension 15 to retain it in a raised condition. Spring 28 is positioned so that extension 15 may be manually disengaged with little physical effort.

Referring to FIG. 3, an alternate embodiment is shown in which a torsion spring 30 may be positioned between the ears 24' of brackets 20' and 21' and may be wound around hinge pin 25' and spacer 27'. One ear 24' of bracket 20' may have a generally U-shaped portion 32 formed in its upper extremity and bent over and downwardly toward the upper surface of elbow 12'. One end 33 of torsion spring 30 may be positioned to be engaged within the portion 32. A similarly U-shaped bent portion 35 may be formed in the diagonally opposite ear 24' of bracket member 21' for engaging the opposite end 36 of torsion spring 30. The torsion spring 30 may be wound on hinge pin 25' so that ends 33 and 36 are biased into engagement with portions 32 and 35 of bracket members 20' and 21' and the spring bias will also tend to pivot bracket 21' about hinge pin 20' in an upwardly direction. The spring bias may be calculated to be of sufficient force to pivot bracket member 21' when the extension pipe 15' is in a generally horizontally extending position, however, when extension 15' is raised upwardly to pivot the extension 15' and bracket 21' out of engagement with elbow 12', the spring force will be sufficient to maintain extension 15' in a generally upwardly extending direction similar to that shown in the phantom view of FIG. 1. This embodiment would eliminate spring catch 28 shown in FIG. 1.

From the foregoing description, it will thus be apparent that in normal usage, the extension pipe 15 will be maintained in its lowered position in engagement with member 16, which in turn is attached to elbow 12 for directing rainwater from downspout 13 through elbow 12 and member 16 and out extension pipe 15 away from the building 14. On occasion, when it is desired to perform routine yard work such as mowing the lawn in the vicinity of extension pipe 15, the extension 15 may be raised manually to a point where the extension 15 engages spring catch 28 to maintain extension 15 in an upraised condition thereby clearing the surrounding yard space formerly occupied by the extension pipe 15. Alternatively, torsion spring 30 may be provided for maintaining extension 15 in an upraised position.

While several embodiments of the invention have thus been described, such descriptions are intended to be illustrative rather than limiting, for the invention may be variously embodied. A generally square extension pipe has been depicted, but it will be apparent to those skilled in the art that the hinge assembly 10 may be constructed to conform to various pipe shapes. Accordingly, the scope of the invention is to be taken solely from an interpretation of the claims which follow.

I claim:

1. An apparatus for pivotally joining a rainpipe downspout to an extension pipe, said apparatus comprising:

hinge means coupled to adjoining ends of said downspout and said extension pipe for enabling said extension pipe to be pivoted between a first position in which said end of said extension pipe is substantially coaxial with but axially spaced apart from said end of said downspout and a second position in which said extension pipe extends generally transverse to said first position, said hinge means comprising first and second bracket means coupled to said ends of said downspout and extension pipe respectively and means pivotally joining said first and second bracket means, each of said first and second bracket means having a generally U-shaped configuration for receiving said ends of said downspout and extension therein, the sides of each of said bracket means having portions extending beyond the periphery of said downspout and extension pipe, resilient coupling sleeve means bridging the axial space between said downspout and extension and affixed to one of said downspout and extension for sealingly engaging in telescopic relationship the other of said downspout and extension when said extension pipe is in said first position and providing a continuous flow path between said downspout and extension and said joining means extends generally perpendicular to the longitudinal axis of said extension pipe and coupled to said portions of said bracket sides.

2. The apparatus set forth in claim 1 including catch means coupled to said downspout for releasably engaging said extension in said second position.

3. The apparatus set forth in claim 2 wherein in said second position said extension extends upwardly in general parallelism with said downspout.

4. The apparatus set forth in claim 1 including spring means coupled to said hinge means for biasing said extension toward said second position.

5. The apparatus set forth in claim 4 wherein in said second position said extension extends upwardly in general parallelism with said downspout.

6. The invention set forth in claim 1 wherein said resilient coupling sleeve means comprises a generally U-shaped sheet of resilient material affixed to said end of said downspout intermediate said downspout and said downspout bracket and including a portion adapted for slidably engaging said end of said extension pipe.

* * * * *